US006537648B1

(12) United States Patent
Takahashi et al.

(10) Patent No.: US 6,537,648 B1
(45) Date of Patent: Mar. 25, 2003

(54) SUBSTRATE FOR AN INFORMATION RECORDING MEDIUM, INFORMATION RECORDING MEDIUM USING THE SUBSTRATE AND METHOD OF PRODUCING THE SUBSTRATE

(75) Inventors: Kouji Takahashi, Tokyo (JP); Takemi Miyamoto, Tokyo (JP); Hiroshi Tomiyasu, Tokyo (JP); Genshichi Hata, Tokyo (JP); Tomotaka Yokoyama, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/540,887

(22) Filed: Mar. 31, 2000

(30) Foreign Application Priority Data

Mar. 31, 1999 (JP) .......................................... 11-094358

(51) Int. Cl.$^7$ ................................................. G11B 5/82
(52) U.S. Cl. ..................... 428/141; 428/64.1; 428/64.2; 428/65.3; 428/694 SG; 428/900
(58) Field of Search ................................ 428/141, 64.1, 428/64.2, 65.3, 694 SG, 900

(56) References Cited

U.S. PATENT DOCUMENTS

| | | | | |
|---|---|---|---|---|
| 5,389,422 A | * | 2/1995 | Okazaki et al. ............. | 428/141 |
| 5,455,730 A | * | 10/1995 | Dovek et al. ................ | 360/113 |
| 6,068,906 A | * | 5/2000 | Sasa et al. .................. | 428/64.2 |
| 6,159,076 A | * | 12/2000 | Sun et al. .................... | 451/36 |
| 6,207,247 B1 | * | 3/2001 | Morita ....................... | 428/64.1 |

* cited by examiner

Primary Examiner—Stevan A. Resan
(74) Attorney, Agent, or Firm—Sughrue Mion, PLLC

(57) ABSTRACT

A substrate for an information recording medium has a microwaviness average height Ra' not greater than 0.05 microinch as measured by a contactless laser interference technique for measurement points within a measurement region of 50 μm□–4 mm□ on a surface of the substrate. The microwaviness average height Ra' is given by:

$$Ra' = \frac{1}{n}\sum_{i=1}^{n} |xi - \bar{x}|,$$

where xi represents a measurement point value of each measurement point, $\bar{x}$ representing an average value of the measurement point values, n representing the number of said measurement points. Alternatively, the substrate has a waviness period between 300 μm and 5 mm and a waviness average height Wa of 1.0 nm or less as measured by the contactless laser interference technique for measurement points in a measurement region surrounded by two concentric circles which is spaced from a center of a surface of the substrate by a predetermined distance. The waviness average height Wa is given by:

$$Wa = \frac{1}{N}\sum_{i=1}^{N} |XI - \bar{X}|$$

where Xi represents a measurement point value of each measurement point, $\bar{X}$ representing an average value of the measurement point values, n representing the number of said measurement points.

7 Claims, 6 Drawing Sheets

SUBSTRATE FOR AN INFORMATION RECORDING MEDIUM, INFORMATION RECORDING MEDIUM USING THE SUBSTRATE AND METHOD OF PRODUCING THE SUBSTRATE

BACKGROUND OF THE INVENTION

This invention relates to a substrate for an information recording medium for use as a recording medium for an information processing apparatus, an information recording medium using the substrate, and a method of producing the substrate.

A magnetic disk is known as one of information recording media. The magnetic disk comprises a substrate and a thin film such as a magnetic layer formed thereon. As the substrate, use has been made of an aluminum substrate or a glass substrate. In recent years, in response to the demand for high-density recording, the glass substrate is used at an increasing ratio because a gap between a magnetic head (which is operable as a recording and/or reproducing head) and the magnetic disk can be small as compared with the aluminum substrate.

Generally, the glass substrate is produced through chemical strengthening in order to increase the strength so that the glass substrate is resistant against a shock when loaded into a magnetic disk drive. Alternatively, the surface of the glass substrate is heat treated to be crystallized so that a crystallized substrate improved in strength is produced. In addition, in order to lower a flying height of the magnetic head as low as possible, the surface of the glass substrate is polished with high precision. Thus, high-density recording is realized.

Not only the glass substrate, the magnetic head is also developed from a thin film head to a magnetoresistive head (MR head), further to a giant (large-sized) magnetoresistive head (GMR head) so as to meet the high-density recording.

However, there arises a problem that, even if the surface roughness Rmax (which is defined as a maximum height representative of a difference between a highest point and a lower point) or Ra (which is representative of a center-line-mean roughness) is reduced by high-precision polishing, the flying height of the magnetic head can not be lowered. The present inventors investigated the cause to find out that a microwaviness present on the surface of the substrate is responsible and that the microwaviness also affects a modulation of the magnetic disk.

Japanese Unexamined Patent Publication (JP-A) No. H08-147688 proposes a glass substrate for a magnetic disk, in which a surface waviness (Wa) and the surface roughness (Ra) satisfy the relationship Wa/Ra≦0.5 in order to reduce a glide height of the magnetic disk.

However, measurement of the surface waviness described in the above-mentioned publication uses a tracer-type surface roughness tester (Tencor) and is carried out over the length on the order of 100 μm along a straight line in a radial direction of the substrate. Thus, the measurement is performed only in a restricted local area and in a single direction. Thus, the above-mentioned measurement does not fully reflect the surface waviness of the whole substrate.

SUMMARY OF THE INVENTION

It is an object of this invention to provide a substrate for an information recording medium and an information recording medium adapted to a high recording density, by adjusting each of a surface waviness (Wa) and a microwaviness (Ra', wa) on the surface of the substrate to a level not exceeding a predetermined range, where each of the surface waviness (Wa) and the microwaviness (Ra', wa) is measured by a measuring method capable of properly expressing the surface waviness (Wa) and the microwaviness (Ra', wa) and has a correlation with a glide height or a modulation of a magnetic disk.

It is another object of this invention to provide a method of producing a substrate for an information recording medium, which is capable of adjusting each of a surface waviness (Wa) and a microwaviness (Ra', wa) on the surface of the substrate to a level not exceeding the predetermined range.

It is still another object of this invention to provide a method of controlling the surface of a substrate for an information recording medium so as to adjust a gliding height of a head slider or a modulation of the information recording medium to a desired value.

This invention has been made in view of the above-mentioned objects and has the following structures.

(Structure 1)

A substrate for an information recording medium, the substrate having a microwaviness average height Ra' not greater than 0.05 microinch as measured by a contactless laser interference technique for measurement points within a measurement region of 50 μm□–4 mm□ on a surface of the substrate, the microwaviness average height Ra' being given by:

$$Ra' = \frac{1}{n}\sum_{i=1}^{n} |xi - \bar{x}|,$$

where xi represents a measurement point value of each measurement point, $\bar{x}$ representing an average value of the measurement point values, n representing the number of the measurement points.

(Structure 2)

A substrate for an information recording medium, the substrate having a microwaviness period between 2 μm and 4 mm and a microwaviness average height Ra' not greater than 0.05 microinch as measured by a contactless laser interference technique for measurement points in a measurement region on a surface of the substrate, the microwaviness average height Ra' being given by:

$$Ra' = \frac{1}{n}\sum_{i=1}^{n} |xi - \bar{x}|,$$

where xi represents a measurement point value of each measurement point, $\bar{x}$ representing an average value of the measurement point values, n representing the number of the measurement points.

(Structure 3)

A substrate for an information recording medium as described in structure 1 to 2, wherein the measurement region is smaller in area than a slider surface of a head slider of a recording and/or reproduction head.

(Structure 4)

A substrate for an information recording medium, the substrate having a disk-like shape, the substrate having a waviness period between 300 μm and 5 mm and a waviness average height Wa of 1.0 nm or less as measured by a contactless laser interference technique for measurement points in a measurement region surrounded by two concentric circles which is spaced from a center of a surface of the disk-shaped substrate by a predetermined distance, the waviness average height Wa being given by:

$$Wa = \frac{1}{N}\sum_{i=1}^{N}|Xi - \overline{X}|$$

where Xi represents a measurement point value of each measurement point, $\overline{X}$ representing an average value of the measurement point values, n representing the number of the measurement points.

(Structure 5)
A substrate for an information recording medium as described in any one of structures 1 through 4, wherein the substrate is a substrate for a magnetic recording medium.

(Structure 6)
A substrate for an information recording medium as described in any one of structures 1 through 5, wherein the substrate is made of a glass.

(Structure 7)
An information recording medium comprising a substrate described in any one of structures 1 through 6 and at least a recording layer formed on the substrate.

(Structure 8)
An information recording medium as described in structure 7, wherein the recording layer is a magnetic layer.

(Structure 9)
A method of producing a glass substrate for an information recording medium, the method comprising the steps of:
preparing a glass substrate having a flatness of 4 μm or less; and
polishing a principal surface of the glass substrate by the use of a soft polisher having a hardness not greater than 80 (Asker-C) and abrasive grains having an average grain size of 1.0 μm or less.

(Structure 10)
A method as described in structure 9, wherein:
the soft polisher has a hardness between 62 and 70 (Asker-C).

(Structure 11)
A method as described in structure 9 or 10, wherein:
the step of preparing the glass substrate is carried out by lapping of a glass material of a disk-like shape.

(Structure 12)
A method as described in any one of structures 9 through 11, wherein:
the polishing step is carried out with a working surface pressure between 40 and 150 g/cm² applied to the glass substrate during polishing.

(Structure 13)
A method as described in any one of structures 9 through 13, wherein:
the polishing step is carried out by feeding the abrasive grains at a flow rate of 50 cc/sec or more with respect to the glass substrate.

(Structure 14)
A method as described in any one of structures 9 through 13, wherein the glass substrate is a substrate for a magnetic recording medium.

(Structure 15)
A method of producing an information recording medium, the method comprising the step of forming at least a recording layer on a substrate obtained by a method described in any one of structures 9 through 14.

(Structure 16)
A method as described in structure 15, wherein the recording layer is a magnetic layer.

(Structure 17)
A substrate for a magnetic recording medium, the substrate having a predetermined microwaviness average height Ra' determined by:
measuring the microwaviness average height Ra' by the use of a contactless laser interference technique for measurement points in a measurement region on a principal surface of the substrate;
evaluating a modulation of a magnetic recording medium comprising the substrate and at least a magnetic layer formed thereon;
comparing the microwaviness average roughness Ra' and the modulation to obtain a correlation therebetween; and
selecting, with reference to the correlation, the predetermined microwaviness average height Ra' so that the modulation has a desired value; the microwaviness average height Ra' being given by $$Ra' = \frac{1}{n}\sum_{i=1}^{n}|xi - \overline{x}|,$$

where xi represents a measurement point value of each measurement point, $\overline{x}$ representing an average value of the measurement point values, n representing the number of the measurement points.

(Structure 18)
A method of controlling a principal surface of a substrate for a magnetic recording medium, the method comprising the steps of:
measuring a microwaviness average height Ra' by the use of a contactless laser interference technique for measurement points in a measurement region on the principal surface of the substrate;
evaluating a modulation M of a magnetic recording medium comprising the substrate and at least a magnetic layer formed on the principal surface thereof;
comparing the microwaviness average height and the modulation M to obtain a correlation therebetween; and
determining, with reference to the correlation, the microwaviness average height Ra' of the substrate so that the modulation has a desired value;
the microwaviness average height Ra' being given by:

$$Ra' = \frac{1}{n}\sum_{i=1}^{n}|xi - \overline{x}|,$$

where xi represents a measurement point value of each measurement point, $\overline{x}$ representing an average value of the measurement point values, n representing the number of the measurement points.

(Structure 19)
A method as described in structure 18, wherein the microwaviness has a microwaviness period between 2 μm and 4 mm.

(Structure 20)
A method as described in structure 18 or 19, wherein the modulation is evaluated by measuring a modulation resulting from the microwaviness of the surface of the substrate.

(Structure 21)
A method as described in structure 20, wherein the modulation is evaluated by measuring a waveprofile in a range between 1/50 and 1/4 of a microwaviness period of the microwaviness.

(Structure 22)

A substrate for a magnetic recording medium, the substrate having a microwaviness average height Ra' determined in accordance with a method described in any one of structures 18 through 21.

(Structure 23)

A substrate for a magnetic recording medium, the substrate having a predetermined microwaviness maximum height wa determined by:

measuring a microwaviness maximum height wa by the use of a contactless laser interference technique for measurement points in a measurement region on a principal surface of the substrate;

carrying out a touch-down-height test for a magnetic recording medium comprising the substrate and at least a magnetic layer formed thereon to obtain a tough-down-height;

comparing the microwaviness maximum height wa and the touch-down-height to obtain a correlation therebetween;

determining, with reference to the correlation, the predetermined microwaviness maximum height wa such that the tough-down-height has a desired value;

the microwaviness maximum height wa representing a difference value between a highest point and a lowest point of a measurement curve in all measurement points of a measurement area.

(Structure 24)

A method of controlling the surface of a substrate for a magnetic recording medium, comprising the steps of:

measuring a microwaviness maximum height wa by the use of a contactless laser interference technique for measurement points in a measurement region on a principal surface of the substrate;

carrying out a touch-down-height test for a magnetic recording medium comprising the substrate and at least a magnetic layer formed thereon to obtain a tough-down-height T;

comparing the microwaviness maximum height wa and the touch-down-height to obtain a correlation therebetween;

determining, with reference to the correlation, the predetermined microwaviness maximum height wa such that the tough-down-height has a desired value;

the microwaviness maximum height wa representing a difference value between a highest point and a lowest point of a measurement curve in all measurement points of a measurement area.

(Structure 25)

A method as described in structure 24, wherein the microwaviness maximum height wa is a value obtained by excluding from the measurement values xi' those values at points of abnormal protrusions.

(Structure 26)

A method as described in structure 25, wherein the microwaviness maximum height wa is a 95% PV value obtained by preparing a histogram of measurement point values xi' at all of the measurement points and extracting the measurement point values falling within a deviation of 95% in a distribution of all measurement point values in the histogram.

(Structure 27)

A method as described in any one of structures 23 through 26, wherein the measurement region of the microwaviness maximum height wa is smaller in area than a slider surface of a head slider of a recording and/or reproducing head.

(Structure 28)

A method as described in structure 26, wherein the principal surface of the substrate has a surface condition having a correlation between a microwaviness average height Ra' and the value obtained by excluding from the measurement values xi' those values at points of abnormal protrusions or between the microwaviness average height Ra' of the 95% PV value, the microwaviness average height Ra' being given by $$Ra' = \frac{1}{n}\sum_{i=1}^{n}|xi - \bar{x}|,$$

where xi represents a measurement point value of each measurement point, $\bar{x}$ representing an average value of the measurement point values, n representing the number of the measurement points.

(Structure 29)

A method as described in structure 28, wherein the surface of the substrate is controlled by the microwaviness average height Ra'.

(Structure 30)

A substrate for a magnetic recording medium, the substrate having a microwaviness maximum height wa determined in accordance with a method described in any one of structures 23 through 29.

DESCRIPTION OF PREFERRED EMBODIMENTS

Figure 1:
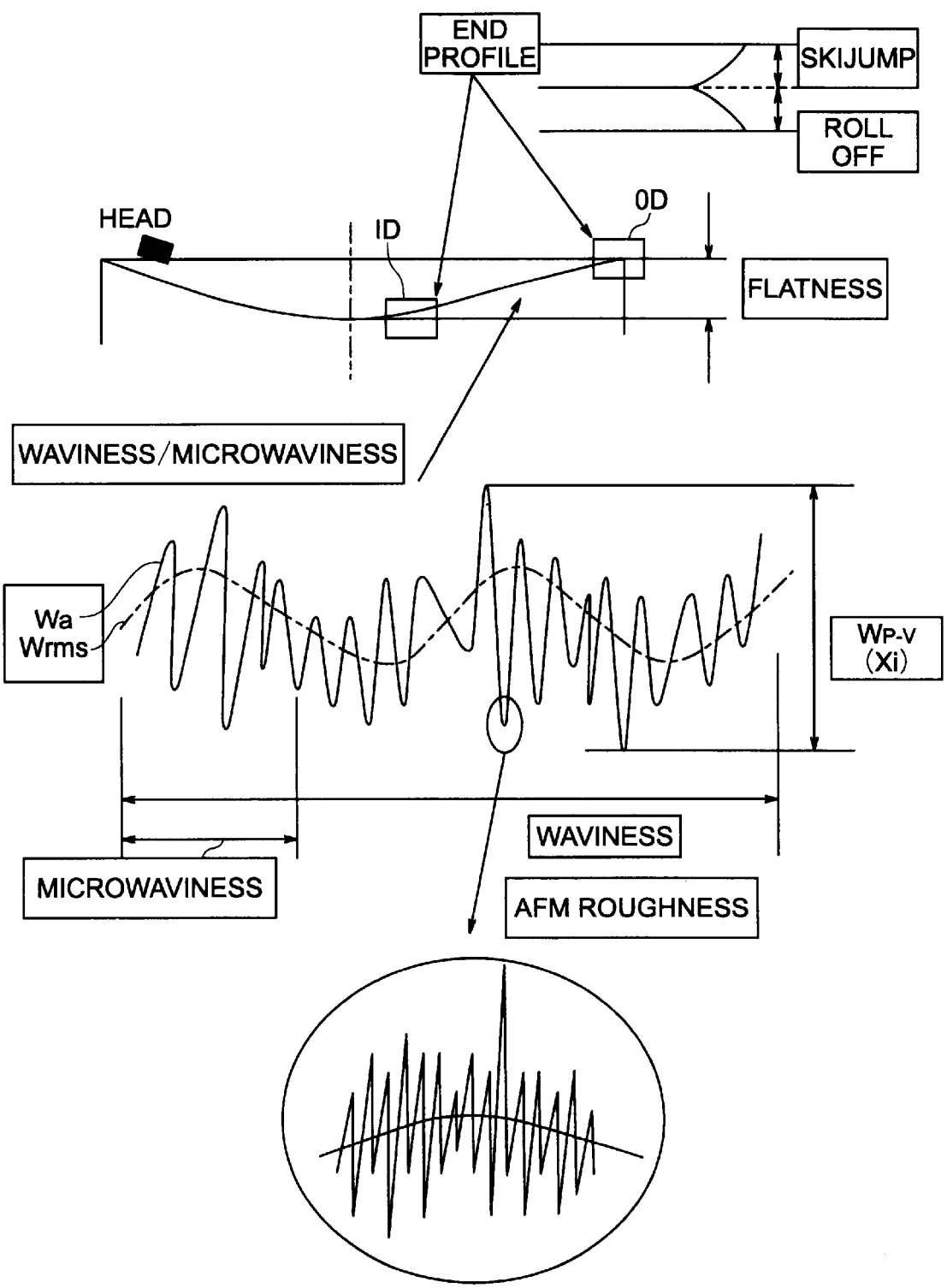
FIG. 1 is a view showing definitions of various measurement values in measurement of a surface waviness.

Next, description will be made of a substrate for an information recording medium according to this invention with reference to definitions of various measurement values illustrated in FIG. 1.

Figure 2:
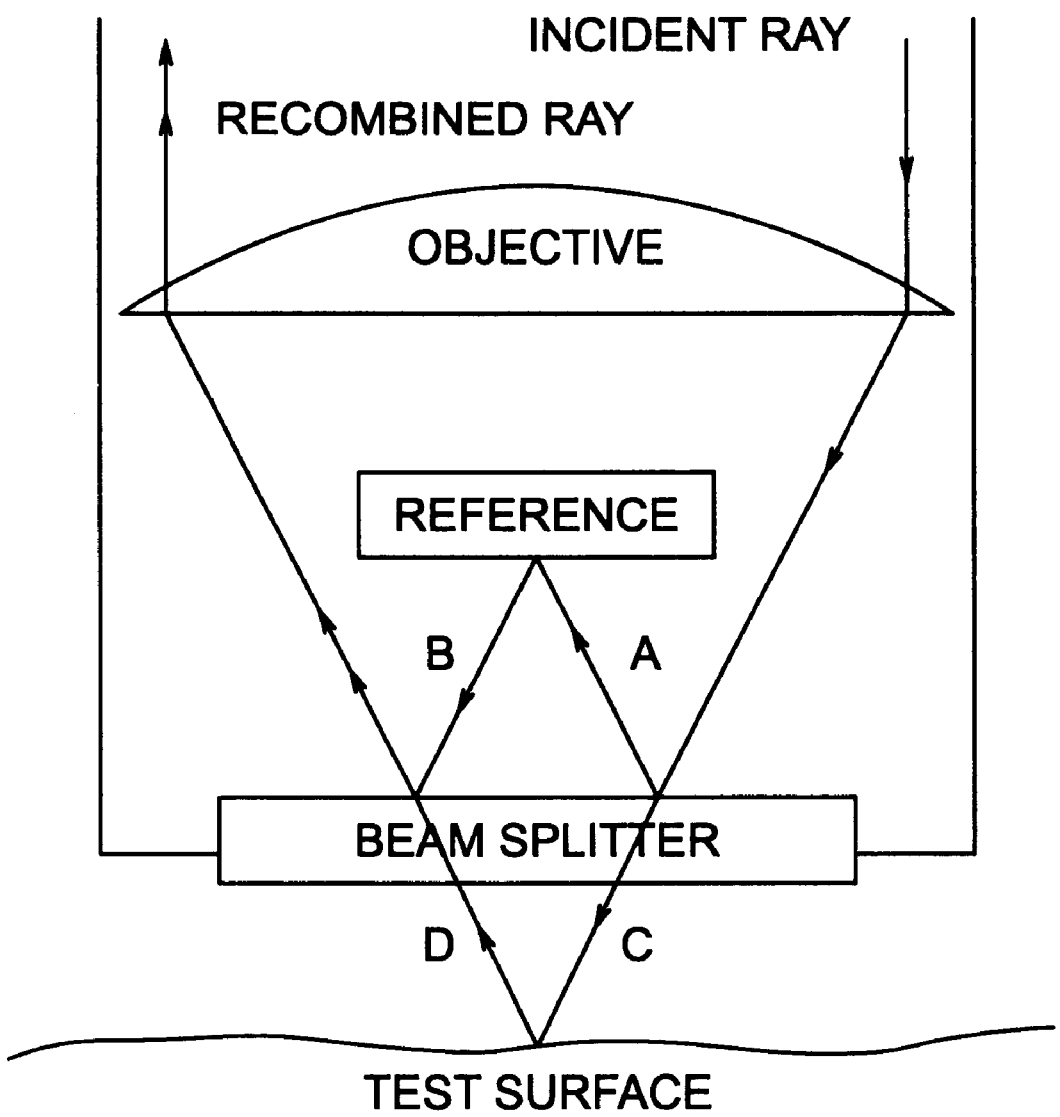
FIG. 2 is a view for describing the principle of measurement of the surface waviness.

A waviness (Wa) of the substrate for an information recording medium of this invention is defined as a measurement value measured by a multifunctional disk interferometer (OPTIFLAT). A microwaviness (Ra', wa) is defined as a measurement value measured by a multifunctional surface analyzer (MicroXAM) manufactured by Phase-Shift Technology. In a manner different from a conventional tracer type device, each of the above-mentioned apparatuses scans a predetermined region on a substrate surface by the use of a white beam (having a wavelength of 680 nm) (OPTIFLAT) and a laser beam (having a wavelength of 552.8 nm) (MicroXAM), combines a reflected beam from the substrate surface and a reflected beam from a reference plane, and calculates the waviness (Wa) and the microwaviness (Ra', wa) from interference fringes produced at combination points. The principle of measurement is schematically shown in FIG. 2. As illustrated in FIG. 2, an optical wave is split into two which are then recombined, in accordance with the principle of an interferometer. The interference fringes appear as a result of an optical path difference between one optical path (A→B) and another optical path (C→D). The detail of the measurement is disclosed, for example, in U.S. Pat. Nos. 5,737,081 and 5,471,307.

For example, a waviness average height Wa is measured by the above-mentioned multifunctional disk interferometer (OPTIFLAT) and has a waviness period or cycle (distance between peaks or between valleys) on the order between 300 $\mu$m and 5 mm. The waviness average height Wa is obtained by the following equation (1).

$$Wa = \frac{1}{N}\sum_{i=1}^{N}|Xi - \overline{X}| \quad (1)$$

Herein, where Xi represents a measurement point value of each measurement point, $\overline{X}$ representing an average value of the measurement point values, n representing the number of the measurement points. That is, Wa reptresents an average of absolute values of deviations from a center line of a measurement curve to the measurement curve.

The measurement points are selected from a predetermined region (recording/reproducing region) within the surface of the substrate. In case of the multifunctional disk interferometer (OPTIFLAT), an annular region extending in a circumferential direction within the surface of the substrate having a disk-like shape is selected as the predetermined region in dependence upon the size of the substrate as follows. It is noted here that the following measurement regions may be appropriately modified as desired.

① 2.5 inch substrate: a range between r=16 mm and r=28 mm (about 73,000 pixels)
② 3.0 inch substrate: a range between r=20.3 mm and r=39.5 mm (about 79,000 pixels)
③ 3.5 inch substrate: a range between r=20.3 mm and r=45.0 mm (about 15,400 pixels)

The waviness average height Wa is thus calculated (1 inch=25.4 mm).

The microwaviness (Ra', wa) is measured, for example, by the use of the above-mentioned multifunctional surface analyzer (MicroXAM) and has a waviness period (distance between peaks or between valleys) on the order between 2 $\mu$m and 4 mm. The microwaviness average height Ra' is given by:

$$Ra' = \frac{1}{n}\sum_{i=1}^{n}|xi - \overline{x}|, \quad (2)$$

where xi represents a measurement point value of each measurement point, $\overline{x}$ representing an average value of the measurement point values, n representing the number of the measurement points. That is, Ra' represents an average of absolute values of deviations form the center line of the measurement curve to the measurement curve. The microwaviness maximum height wa represents a difference value between a highest point and a lowest point of a measurement curve in all measurement points of a measurement area.

In case of the multifunctional surface analyzer (MicroXAM), a rectangular region is appropriately selected within a range of 50 $\mu$m□–4 mm□ in a desired region (recording/reproducing region) of the substrate, preferably, a center region or a region spaced by a predetermined distance from the end of the substrate. For example, selection is made of a rectangular region of about 500 $\mu$m×about 600 $\mu$m (about 250,000 pixels) smaller than a surface area of a slider surface of a head slider. Thus, with reference to the slider surface of the head slider contributing to actual running of the head slider on the surface of the magnetic disk, the region smaller than the surface area of the slider surface is selected (the above-mentioned structure 3). The selection in the manner mentioned above is preferable because the correlation with the touch-down-height or the modulation is obtained. The waviness thus calculated is called a microwaviness.

If the waviness average height Wa and the microwaviness (Ra', wa) are defined as mentioned above, it is advantageous that the substrate for an information recording medium has a microwaviness average height Ra' not greater than 0.05 microinch (1 inch=25.4 mm) as measured by a contactless laser interference technique for measurement points within a measurement region of 50 $\mu$m□–4 mm□ of the surface of the substrate (structure 1) or that the substrate for an information recording medium has a microwaviness period between 2 $\mu$m and 4 mm and a microwaviness average height Ra' not greater than 0.05 microinch as measured by a contactless laser interference technique (structure 2). With the above-mentioned structures 1 and 2, it is possible to effectively reduce both the touch-down-height and the modulation which have been high due to the microwaviness. Thus, the magnetic recording medium capable of performing recording and reproducing operations with a high recording density can be obtained. The microwaviness average height Ra' is desired to have a small value which is preferably equal to 0.03 microinch or less, more preferably, 0.15 microinch or less.

In addition, it is advantageous that the substrate for an information recording medium has a disk-like shape and a waviness period between 300 $\mu$m and 5 mm and a waviness average height Wa of 1.0 nm or less as measured by a contactless laser interference technique for measurement points in a measurement region surrounded by two concentric circles which is spaced from the center of the surface of the disk-shaped substrate by a predetermined distance, as described in the above-mentioned structure 4. With this structure, it is possible to effectively reduce both the touch-down-height and the modulation which have been high due to the waviness. Thus, the magnetic recording medium capable of performing recording and reproducing operations with a high recording density can be obtained. The waviness average height Wa is desired to have a small value.

Upon calculating the waviness average height Wa and the microwaviness (Ra', wa) in accordance with the equations (1), (2), and (3), the measurement value $X_i$ may have an abnormal value (referred to as a high-frequency layer). In this event, calculation is carried out after the abnormal value is removed by the filter.

In this invention, the surface roughness of the substrate is an important factor in view of the reduction in flying height of the magnetic head. The surface roughness is measured by the inter-atomic force microscope (AFM). As illustrated in FIG. 1, the surface roughness measured by the AFM has a period smaller than that of the waviness measured by the contactless laser interference technique. Generally, a plurality of periods (between peaks or between valleys) of the surface roughness are present within a single period of the waviness. As measured by the AFM, the surface roughness preferably satisfies Rmax≦15 nm, Ra≦1 nm, Rq≦1.5 nm. More preferably, Rmax≦10 nm, Ra≦0.5 nm, Rq≦0.7 nm, further preferably, Rmax≦5 nm, Ra≦0.3 nm, Rq≦0.4 nm,.

Herein, Rmax, Ra, and Rq are defined by the Japanese Industrial Standard (JIS B0601). Rmax is the above-mentioned maximum height (the distance from a highest peak to a lowest valley), Ra is the above-mentioned center-line-mean roughness (the average of an absolute value of a deviation from a center line of roughness curve to the roughness curve (or a measurement curve), and Rq is a root-mean-square roughness (=RMS) which is obtained by calculating a deviation from the center line to the roughness curve (or the measurement curve), calculating a square of the deviation, integrating the square for a period corresponding to an evaluation length, averaging the integration result for the period, and obtaining a root of the average.

In particular, the surface roughness Rp (measured by AFM) is one of the factors determining TDH (touch-down-height) as a factor for the reduction in flying height of the magnetic head. $R_p$ is not greater than a desired value of the TDH. In order to carry out the recording and the reproducing operations with a high recording density, it is preferred that $R_p \leq 5$ nm, more preferably, $Rp \leq 3$ nm.

Herein, $R_p$ represents a center line depth which is a value obtained for the evaluation length extracted from the roughness curve in parallel to the center line and represented by a distance between the center line and a line parallel to the center line and passing through a peak point.

In this invention, no restriction is imposed upon the kind, the size, and the thickness of the substrate. As a material of the substrate, use may be made of glass, ceramics, silicon, carbon, plastic, polycarbonate, or a metal such as aluminum. Among others, the glass substrate is preferred in view of the flatness, the smoothness, the mechanical strength, and the cost. As a material of the glass substrate, use may be made of an aluminosilicate glass, a soda-lime glass, a soda aluminosilicate glass, an aluminoborosilicate glass, a borosilicate glass, a quartz glass, and glass ceramics of a crystallized glass or the like. In view of the smoothness, an amorphous glass is preferable as compared with the crystallized glass. In particular, a chemically reinforced glass of the aluminosilicate glass or the like is preferred in view of the mechanical strength, the shock resistance, and the vibration resistance.

As the aluminosilicate glass, use is preferably made of a chemically reinforced glass (chemically reinforced glass A) essentially consisting of 58–75 wt % $SiO_2$, 5–23 wt % $Al_2O_3$, 3–10 wt % $Li_2O$, and 4–13 wt % $Na_2O$, a chemically reinforced glass (chemically reinforced glass B) essentially consisting of 5–30 mol % $TiO_2$ ($Ti_2O_2$), 1–45 mol % CaO, 10–45 mol % MgO+CaO, 3–30 mol % $Na_2O+Li_2O$, 0–15 mol % $Al_2O_3$, and 35–60 mol % $SiO_2$, or the like. By chemical strengthening, the aluminosilicate glass of each of the above-mentioned compositions is increased in transversal rapture strength, increased in depth of a compressive stress layer, and improved in Knoop hardness. In view of the controllability of the surface waviness average height Wa, the above-mentioned chemically reinforced glass B having a large Young's modulus is preferable.

In the substrate of this invention, the surface of the glass substrate may be subjected to chemical strengthening by a low-temperature ion exchange technique in order to improve shock resistance and vibration resistance. In order to perform the chemical strengthening, known chemical strengthening techniques may be used without specific restriction. For example, use is preferably made of low-temperature chemical strengthening in which ion exchange is performed in a temperature range not exceeding the transition temperature in view of the glass transition point. As alkali molten salt used in the chemical strengthening, use may be made of potassium nitrate, sodium nitrate, or a nitrate mixture thereof.

In order to improve the smoothness, the chemically reinforced glass is generally subjected to a plurality of polishing steps to have a desired surface roughness. However, the flatness and the waviness adjusted in the lapping step may sometimes be deteriorated by the elasticity of a polishing pad or the accuracy (conformity) of the surface plate used in the polishing step. On the other hand, in case of the crystallized glass, use is made of a diamond pellet having a relatively small grain size because the mechanical strength is relatively high. Therefore, the smoothness and the flatness are relatively high. Accordingly, the load in the polishing step is small and a product having a relatively small waviness is readily obtained.

Due to the difference in production process of the glass substrate, the chemically reinforced glass is often difficult to obtain a surface condition having small values of the waviness average height Wa and the microwaviness (Ra', wa). In this invention, even if such chemically reinforced glass is used, it is possible to obtain the surface of the glass substrate which is small in waviness average height Wa and in microwaviness (Ra', wa) by selecting a predetermined polishing condition. In this invention, it is possible to obtain the glass substrate having small values of the waviness average height Wa and the microwaviness (Ra', wa) even from the chemically reinforced glass, by adjusting the flatness of the glass substrate before the polishing step to a predetermined value (4 μm) or less and by using in the polishing step abrasive grains having an average grain size of 1.0 μm or less, as described in the structure 9. Herein, the soft polisher preferably has a hardness of 62–72 (Asker-C), more preferably, 66–70 (Asker-C), as described in the structure 10. In case where the hardness of the soft polisher is as small (soft) as less than 62, the polishing pad is readily deformed during polishing to deteriorate the waviness and the microwaviness. On the other hand, if the hardness is as great hard (as more) than 72, a high smoothness can not be obtained. The average grain size of the abrasive grains used herein is 1.0 μm or less because the smooth surface can not be obtained otherwise. In this invention, by simplifying the polishing step (after the above-mentioned flatness is achieved in the lapping step, precision-polishing is carried out by the soft polisher without executing first polishing by a hard polisher), it is possible to reduce the production cost and to obtain the glass substrate having the small values of the waviness average height Wa and the microwaviness (Ra', wa). In this case, in order to reduce the waviness and the surface waviness, it is desired to adjust the surface roughness before the polishing step (after the lapping step) so that Ra is not greater than 0.4 μm and Rmax is not greater than 5.0 μm, preferably, Ra is not greater than 0.3 μm and Rmax is not greater than 3.0 μm. It is noted that the conventional first polishing step may be performed. In this case, it is desired that the surface roughness after the first polishing step is adjusted so that Ra is not greater than 1.5 μm and Rmax is not greater than 20 μm.

The waviness and the microwaviness have an influence upon a working surface pressure applied to the glass substrate during the polishing step. The working surface pressure applied to the glass substrate during the polishing step is preferably within a range between 40 and 150 g/cm², as described in the structure 12, more preferably, 50 and 80 g/cm². A too small working surface pressure (less than 40 g/cm²) is unfavorable because the polishability is degraded. A too large working surface pressure (more than 150 g/cm²) is unfavorable because the waviness and the microwaviness are increased due to the deformation of the polishing pad.

The waviness and the microwaviness also have an influence upon the flow rate of the abrasive grains with respect to the glass substrate during the polishing step. As described in the structure 13, the flow rate of the abrasive grains with respect to the glass substrate during polishing is preferably equal to 50 cc/sec or more. A low flow rate (less than 50 cc/sec) of the abrasive grains is unfavorable because the abrasive grains are not spread over the principal surface of the glass substrate which is therefore polished in direct contact with the polisher to degrade the waviness and the microwaviness.

The waviness and the microwaviness also have an influence upon the rotation speed of the surface plate at the completion of the polishing step. If the rotation speed of the surface plate before the stop of polishing in the polishing step is lower than that during polishing, the elasticity of the polishing pad at the stop of polishing is stabilized so that the waviness and the microwaviness on the surface of the substrate can be reduced.

The abrasive grains used in the polishing step are not particularly restricted as far as the abrasive grains have the above-mentioned average grain size. For example, use is made of cerium oxide, zirconium oxide, manganese oxide, and colloidal silica.

The substrate for an information recording medium in this invention can be used as a substrate for a magnetic recording medium, a substrate for a magnetooptical disk, a substrate for an electronic disk such as an optical disk, or the like. Among others, the substrate for an information recording medium according to this invention is suitable for use in a magnetic recording medium for which recording and reproducing operations are carried out by a magnetic head on a head slider running along the surface of the medium, or a magnetooptical disk for which recording and reproducing operations are carried out by a head slider having an optical pickup lens (such as a solid immersion lens). This is because the waviness and the microwaviness of the surface of the substrate affect the flying height of the head slider. In particular, the substrate cap advantageously be used as a magnetic disk substrate, as described in the structure 5. For example, the substrate is suitable for a magnetic disk substrate for which recording and reproducing operations are performed by a magnetoresistive head (giant (large-sized) magnetoresistive head).

In the structures 7 and 8, the information recording medium comprises the substrate mentioned in one of the above-mentioned structures 1 through 6 and at least a recording layer formed thereon. In particular, in the structures 15 and 16, the magnetic recording medium comprises the substrate and a magnetic layer as the recording layer. With these structures, it is possible to prevent degradation in touch-down-height and in modulation as a result of the waviness and the microwaviness on the surface of the substrate. Therefore, recording and reproducing operations with a high recording density can be achieved. For example, the information recording medium in this invention comprises the substrate for an information recording medium of this invention and at least a recording layer such as a magnetic layer formed thereon.

For example, the magnetic recording medium generally comprises a magnetic disk substrate which has a predetermined flatness and a predetermined surface roughness and which may be subjected to chemical strengthening of its surface, if necessary, and is produced by successively stacking an underlayer, a magnetic layer, a protection layer, and a lubricant layer on the substrate.

The underlayer in the magnetic recording medium is selected in dependence upon the magnetic layer.

For example, the underlayer comprises at least one material selected from nonmagnetic metals such as Cr, Mo, Ta, Ti, W, V, B, Al, and Ni. In case of a Co-based magnetic layer, a Cr element or a Cr alloy is preferable in view of the improvement in magnetic characteristics. The underlayer is not restricted to a single layer but may have a multilayer structure formed by a plurality of layers of a same kind or different kinds. For example, use may be made of a multilayered underlayer such as Cr/Cr, Cr/CrMo, Cr/CrV, CrV/CrV, NiAl/Cr, NiAl/CrMo, NiAl/CrV, or the like.

The material of the magnetic layer in the magnetic recording medium is not particularly restricted.

For example, the magnetic layer may comprise a Co-based magnetic film such as CoPt, CoCr, CoNi, CoNiCr, CoCrTa, CoPtCr, CoNiPt, CoNiCrPt, CoNiCrTa, CoCrPtTa, CoCrPtB, CoCrPtTaNb, or CoCrPtSiO. The magnetic layer may have a multilayer structure formed by dividing a magnetic film by a nonmagnetic film (for example, Cr, CrMo, or CrV) to reduce a noise.

The magnetic layer adapted to the magnetoresistive head (MR head) or the giant (large-sized) magnetoresistive head (GMR head) may comprise a Co alloy and an impurity element selected from Y, Si, a rare earth element, Hf, Ge, Sn, and Zn or oxide of the impurity element.

Besides, the magnetic layer may have a granular structure comprising a nonmagnetic film made of ferrite, an iron-rare earth alloy, $SiO_2$, BN, or the like with magnetic particles such as Fe, Co, FeCo, CoNiPt dispersed therein. The magnetic layer may be of either an in-plane or a vertical recording type.

The protection layer in the magnetic recording medium is not particularly restricted.

For example, the protection layer may comprise a Cr film, a Cr alloy film, a carbon film, a zirconia film, or a silica film. Such protection film can be formed by an in-line sputtering apparatus together with the underlayer and the magnetic layer in a continuous manner. The protection film may be a single layer or may have a multilayer structure comprising a plurality of films of a same kind or different kinds.

In this invention, another protection layer may be formed on the above-mentioned protection layer or instead of the above-mentioned protection layer. For example, instead of the above-mentioned protection layer, a silicon oxide ($SiO_2$) film may be formed by coating a Cr film with tetraalkoxysilane diluted by an alcoholic solvent with colloidal silica fine particles dispersed therein and by baking (or sintering) the same.

The lubricant layer in the magnetic recording medium is not particularly restricted.

For example, the lubricant layer is formed by diluting perfluoropolyether as a liquid lubricant with a Freon-based solvent, applying the lubricant on the surface of the medium by the dipping method, the spin coating method, or the spraying method, and, if necessary, carrying out heat treatment.

This invention also provides a method of controlling the surface of the substrate for a magnetic recording medium so that the modulation of the magnetic recording medium and the touch-down-height have desired characteristics.

With respect to the modulation, the surface of the substrate is controlled as described in the structure 18. Specifically, a microwaviness average height Ra' is measured by the use of a contactless laser interference technique for measurement points in a measurement region on a principal surface of the substrate for a magnetic recording medium. A modulation M of a magnetic recording medium comprising the substrate and at least a magnetic layer formed on the principal surface thereof is evaluated. The microwaviness average height Ra' and the modulation M are compared to each other to obtain a correlation therebetween. With reference to the correlation, the predetermined microwaviness average height Ra' of the substrate is determined so that the modulation has a desired value. Herein, the microwaviness average height Ra' is defined in the structure 1. There are a number of parameters representing the surface of the substrate for a magnetic recording medium. For those parameters, the relationship with the modulation was examined through a number of experimental tests. As a result, it has been found out that the modulation has a correlation with the microwaviness average height Ra' of the surface of the substrate. For example, the modulation is measured for one- or two-round travel along a track. Therefore, it is preferable to select Ra' representative of a global average of the microwaviness. The microwaviness maximum height wa defined in the structure 23 depends upon irregular protrusions formed on the surface of the substrate and, therefore, is not so suitable to establish the correlation with the modulation. As described in the structure 19, the microwaviness period particularly correlated with the modulation ranges between 2 μm and 4 mm. In order to obtain more preferable correlation, the microwaviness period is between 2 μm and 650 μm. The modulation is classified into a long time modulation caused by sputtering upon deposition of the magnetic layer and a short time modulation caused by the microwaviness of the substrate. The modulation of the magnetic disk is evaluated as a total modulation obtained by summing up the long time modulation and the short time modulation. The modulation referred to in the structures 18 and 19 is closely relevant with the short time modulation caused by the microwaviness of the surface of the substrate, as described in the structure 20. Therefore, the short time modulation is preferably selected therefor. For example, the short time modulation is measured try the use of an oscilloscope and obtained by measuring the waveprofile over $1/50-1/4$ period, preferably, $1/50-1/15$ period. Likewise the long time modulation is measured by the use of an oscilloscope and obtained by measuring waveprofile over 1 period.

With respect to the touch-down-height; the surface of the substrate is controlled as follows. As described is the structure 24, a microwaviness maximum height wa was measured by the use of a contactless laser interference technique for measurement points in a measurement region on a principal surface of the substrate. A touch-down-height test is carried out for a magnetic recording medium comprising the substrate and at least a layer formed thereon to obtain a touch-down-height T. The microwaviness maximum height wa and the touch-down-height is compared to obtain a correlation therebetween. With reference to the correlation, the predetermined microwaviness maximum height wa of the substrate for a magnetic recording medium is determined so that the tough-down-height of the magnetic recording medium has a desired value. Herein, the microwaviness maximum height wa is defined in the structure 24. There are a number of parameters representing the surface of the substrata for a magnetic recording medium. For those parameters, the relationship with the touch-down-height was examined through a number of experimental tests. As a result, it has been found out that the touch-down-height has a correlation with the microwaviness maximum height wa of the surface of the substrate. The touch-down-height is obtained as follows. Specifically, the relationship between the flying height of a test head and the rotation speed of the magnetic disk is preliminarily measured by a flying height measuring instrument. Then, the flying height of the test head is obtained from the rotation speed of the magnetic disk. The touch-down-height is defined as a flying height of the test head when the protrusion on the magnetic disk is started to collide with the test head. The touch-down-height is substantially equal to the height of the protrusion present on the surface of the substrate. The microwaviness maximum height wa is preferably selected from the above-mentioned characteristics. As mentioned above, the microwaviness has a period ranging between 2 μm and 4 mm (preferably, between 2 μm and 650 μm. The surface of the substrate has protrusions such as particles. As described in the structure 25, the microwaviness maximum height wa is obtained by excluding from the measurement values xi' those values at points of abnormal protrusions. This approach is preferable because a closer correlation with the touch-down-height is obtained. Specifically, as described in the structure 26, the microwaviness maximum height wa is a 95% PV value obtained by preparing a histogram of measurement point values xi' at all at the measurement points and extracting the measurement point values falling within a deviation of 95% in a distribution of all measurement point values (n the histogram. The deviation may be selected between 90% and 99%. As described in the structure 30, the measurement region of the microwaviness maximum height wa is preferably smaller in area than a slider surface of a head slider (magnetic head). While the head slider is flying and running on the magnetic disk, the magnetic disk follows the head if the waviness of the surface has a long period. If the measurement region is greater than the surface area of the head slider, the waviness having a long waviness period irrelevant to the touch-down-height is also included Now, this invention will be described more in detail in conjunction with the mode of embodying the invention.

Embodiment 1

(1) Rough Lapping Step

At first, a molten glass was subjected to direct press using an upper die, a lower die, and a body die to obtain a disk-shaped glass substrate made of an aluminosilicate glass having a diameter of about 66 mm φ and a thickness of 1,2 mm.

Instead of the direct press, a disk-shaped glass substrate may be cut out by the use of a grindstone from a sheet glass formed by a down drawing technique or a floating technique.

As the aluminosilicate glass, use was made of a chemically reinforcing glass essentially consisting 58–75 wt % $SiO_2$, 5–23 wt % $Al_2O_3$, 3–10 wt % $Li_2O$, and 4–13 wt % $Na_2O$ (for example, an aluminosilicate glass consisting of 63.5 wt % $SiO_2$, 14.2 wt % $Al_2O_3$, 10.4 wt % $Na_2O$, 5.4 wt % $Li_2O$, 6.0 wt % $ZrO_2$, 0.4 wt % $Sb_2O_3$, and 0.1 wt % $As_2O_3$).

Next, the gases substrate was subjected to a lapping step. The lapping step is intended to improve the dimensional accuracy and the shape accuracy The lapping step was performed by the use of a lapping apparatus with abrasive grains having a grain size of #400.

Specifically, alumina grains having a grain size of #400 were used first. Under the load L set at about 100 kg, an inner gear and an outer gear were rotated to lap opposite surfaces of the glass, substrate received in a carrier so as to obtain the profile irregularity between 0 and 1 μm and the surface roughness (Rmax) on the order of 6 μm (measured according to JIS B 0601).

(2) Shaping Step

Then, by the use of a cylindrical grindstone, a hole was formed at the center of the glass substrate. In addition, an outer peripheral end face was ground to reduce the diameter to 65 mm φ. Thereafter, the outer peripheral end face and an inner peripheral surface were subjected to predetermined chamfering. At this time, the end face of the glass substrate had a surface roughness on the order of 4 µm as Rmax.

(3) End Face Mirror Finishing Step

Next, the glass substrate was rotated and the end face of the glass substrate was polished by the use of a brush to have a surface roughness on the order of 1 µm as Rmax and 0.3 µm as Ra.

After completion of the end face mirror finishing, the surface of the glass substrate was cleaned with water.

Next, the surface of the glass substrate was subjected to lapping with different abrasive grains having a size of #1000 to achieve the flatness of 3 µm, Rmax of about 2 µm, and Ra of about 0.2 µm (Rmax and Ra being measured by AFM). The flatness was measured by a flatness measuring instrument as a distance (difference in height) between a highest part and a lowest part of the surface of the substrate in the vertical direction (perpendicular to the surface).

After the above-mentioned lapping step, the glass substrate was immersed successively in a neutral detergent and water in respective cleaning tanks to be cleaned.

(5) Polishing Step

Next, a polishing step was performed. The polishing step is intended to remove scratches and distortions left by the above-mentioned lapping step and was carried out by the use of a polishing apparatus.

Specifically, the polishing step was carried out by the use of a hard polisher having a hardness of 68 (Asker-C) as a polisher (polishing cloth) under the following polishing condition.

Abrasive Solution: cerium oxide (average grain size of 1.0 µm) (free grains)+water
    Working Pressure: 200 kg (Surface Pressure: 66 g/cm$^2$)
    Polishing Time: 80 min
    Removed Amount: 50 µm During Polishing
    Rotation Speed of Upper Surface Plate: 20 rpm
    Rotation Speed of Lower Surface Plate: 28 rpm
    Rotation Speed of Carrier (Revolution): 3 rpm
    Rotation Speed of Carrier (Rotation): 3 rpm Before Stop of Polishing
    Rotation Speed of Upper Surface Plate: 4 rpm
    Rotation Speed of Lower Surface Plate: 10 rpm
    Rotation Speed of Carrier (Revolution): 3 rpm
    Rotation Speed of Carrier (Rotation): 3 rpm After completion of the above-mentioned polishing step, the glass substrate was immersed successively in a hydrofluosilic acid, a neutral detergent, pure water, pure water, IPA (isopropyl alcohol), end IPA (steam drying) In respective cleaning tanks to be cleaned.

(6) Chemical Strengthening Step

Then, the glass substrate after completion of the cleaning step was subjected to chemical strengthening. The chemical strengthening was performed by filling a chemical strengthening tank with a chemical strengthening solution and immersing the glass substrate held by a holding member into the chemical strengthening solution. The holding member for holding the glass substrate comprises three columns with a plurality of V grooves formed at a predetermined space in an arrangement direction of the glass substrates, and coupling members connecting these columns at their both end faces. The glass substrates are held so that each glass substrate is three-point supported by the V grooves of the three columns in a same plane, and are arranged in parallel in an extending direction of the columns.

In detail, the chemical strengthening was performed by preparing the chemical strengthening solution comprising a mixture of potassium nitrate (60%) and sodium nitrate (40%), heating the chemical strengthening solution to 400° C., and immersing the glass substrate cleaned and preheated to 300° C. into the solution for about 3 hours. In order to chemically strengthen an entire region of each surface of the glass substrate during immersing, the glass substrates were held by the holding member at their end faces.

Thus, by immersing into the chemical solution, lithium ions and sodium ions in a surface layer of the glass substrate were replaced by sodium ions and potassium ions in the chemical strengthening solution, respectively, so that the glass substrate was strengthened.

A compressive stress layer formed on the surface layer of the glass substrate had a thickness between about 100 and about 200 µm.

After completion of the above-mentioned chemical strengthening, the glass substrate was immersed in water kept at 20°C. to be quenched, and held for about 10 minutes. In this manner, defective products with small cracks can be removed.

After completion of the above-mentioned chemical strengthening step, the glass substrate was immersed successively in a neutral detergent, pure water, pure water, IPA (isopropyl alcohol), and IPA (steam drying) in respective cleaning tanks to be cleaned.

For the glass substrate obtained through the above-mentioned steps, the microwaviness average height Ra' of the principal surface were measured by a multifunctional surface analyzer (MicroXAM: manufactured by PHASE SHIFT TECHNOLOGY). The waviness average height Wa of the principal surface was measured by a multifunctional disk interferometer (OPTIFLAT: manufactured by PHASE SHIFT TECHNOLOGY). The surface roughness was measured by the USE of an atomic force MICROSCOPE (AFM) (measurement at 5 µm square). The flatness was measured by a multifunctional disk interferometer (OPTIFLAT: manufactured by PHASE SHIFT TECHNOLOGY). The end profiles (Ski Jump, Roll-Off) of the inner end face (ID) and the outer end face (OD) of the substrate were measured by a surface roughness measuring instrument Surftest SV-624 manufactured by Mitsutoyo. The results were as follows.

Ra'=0.028 µ inch (MicroXAM),
    Wa=0.517 nm (OPTIFLAT),
    Ra=0.908 nm (AFM),
    Rmax=7.537 nm (AFM),
    Rp=3.874 nm (AFM).
    Flatness=0.885 µm,
    Ski-Jump (ID)=0.023 µm,
    Roll-Off (ID)=0.006 µm,
    Ski-Jump (OD)=0.030 µm,
    Roll-Off (OD)=0.039 µm.

(Herein, Ra' (MicroXAM) is an average of 12 points for each of positions 0°, 90°, 180°, and 270° within the principal surface of the substrate at the sides of ID, MD (middle point of the recording/reproducing region), and OD.)

The Ski-Jump and the Roll-Off mentioned above were measured in the following manner. Assume a section of the magnetic disk substrate taken along a plane passing the center of the magnetic disk substrate and perpendicular to the principal surface. In the above-mentioned section, two reference points are determined within a recording area on the principal surface (contour line) and identified as R1 and R2 in the order from the nearest to the center. In addition, another point R3 is determined on the contour line at a predetermined margin outward from the outer peripheral end of the recording area. Next, the points R1 and R2 are connected and an extension line is delineated. In this event, in the region of the points R2 and R3, the distance between the point on the contour line of the substrate and the line R1-R2 (or its extension line) is measured. A particular point or the contour line of the substrate where the distances is greatest is a Ski-Jump point and the distance is a Ski-Jump value. The point R3 is a Roll-Off point. The distance between the point R3 and the line R1-R2 (for its extension line) is a Roll-Off value.

(7) Magnetic Disk Producing step

On each of the opposite surfaces of the glass substrate for a magnetic disk obtained through the above-mentioned steps, a NiAl seed layer, a CrMo underlayer a CoCrPtTa magnetic layer, and a carbon hydride protection layer were successively deposited by the use of an in-line sputtering apparatus. Furthermore, a perfluoropolyether lubricant layer was deposited by dipping to obtain a magnetic disk.

The magnetic disk thus obtained was subjected to a touch-down-height (TDH) test. As a result, an excellent value of 7 nm or less was obtained. In addition, a gliding test was performed. As a result, hit (light touch of the head with a protrusion on the surface of the magnetic disk) and crash (collision of the head against the protrusion or the surface of the magnetic disk) were not observed. It was confirmed that no defect was produced it a film such as a magnetic layer by the protrusion causing the thermal asperity.

For the magnetic disk, the modulation was measured by an oscilloscope. As a result, excellent values of 1.5–2% in long time modulation, 3.6–4% in short time modulation, and 5–6% in total modulation were obtained.

The long time modulation is a modulation resulting from sputtering and, formed in a substrate transfer direction in the in-line sputtering apparatus. On the other hand, the short time modulation is a modulation resulting from the microwaviness of the substrate. Hereinafter, the method of measuring the modulation will briefly be described. The results of measurement of the modulation Hereinafter, given were obtained by the following method.

(1) A magnetic disk is set in an electromagnetic conversion characteristic tester (Guzik). After a magnetic head is loaded on a magnetic disk, an MF pattern (the frequency of a half of the high frequency used by a hard disc drive) is written.

(2) A readout signal from Guzik is supplied to an analog oscilloscope.

(3) A trigger signal is applied by a Spindle Index Pulse (the pulse produced in a spindle motor whenever the disc is rotated by one rotation) by Guzik.

(4) An abscissa (time axis) is adjusted so that the waveprofiles corresponding to two-round travel and 1/30-round travel can be illustrated in case where the long time modulation and the short time modulation are measured, respectively.

(5) An ordinate (voltage axis) is adjusted so that the waveprofile has an appropriate level.

(6) A cursor is displayed and a Vp-p value (A) at a peak of the waveprofile and a Vp-p value (B) at a valley are measured.

(7) The following value is obtained as a long (short) time modulation.

Modulation $M=(A/((A+B)/2-1)\times 100$

COMPARATIVE EXAMPLE 1

A glass substrate was prepared in a manner similar to the embodiment 1 except that the abovementioned polishing step is two-stage polishing including a first polishing step and a second polishing step (final polishing step).

1st Polishing Step

As a polisher (abrasive powder), a hard polisher (cerium pad MHC 15: manufactured by Speedfam) was used.

Abrasive Solution: cerium oxide (average grain size of 1.3 $\mu$m) (free grains)+water Working Pressure: 300 kg (Surface Pressure: 100 g/cm$^2$)

Polishing Time: 30 min

Removed Amount: 45 $\mu$m

During Polishing

Rotation Speed of Upper Surface Plate: 34 rpm

Rotation Speed of Lower Surface Plate: 40 rpm

Rotation Speed of Carrier (Revolution): 3 rpm

Rotation Speed of Carrier (Rotation) 3 rpm

Before Stop of Polishing

Rotation Speed of Upper Surface Plate: 14 rpm

Rotation Speed of Lower Surface Plate: 20 rpm

Rotation Speed of Carrier (Revolution): 3 rpm

Rotation Speed of Carrier (Rotation): 3 rpm

After the first polishing step, the glass substrate had a flatness of 5 $\mu$m, Rmax en the order of 18 nm, and Ra on the order of 1.6 nm (Rmax end Ra were measured by the AFM).

2nd Polishing Step (Final Polishing Step)

Abrasive Solution: cerium oxide (average grain size of 1.0 $\mu$m) (free grains)+water Working Pressure: 300 kg (Surface Pressure: 100 g/cm$^2$)

Polishing Time: 7 min

Removed Amount: 5 $\mu$m

The rotation speeds of the surface plates and the carrier are equal to those in the first polishing step.

For the glass substrate obtained through the above-mentioned steps, the microwaviness average height Ra' and wa of the principal surface were measured by a multifunctional surface analyzer (Micro XAM: manufactured by PHASE SHIFT TECHNOLOGY). The waviness average height Wa of the principal surface was measured by a multifunctional disk interferometer (OPTIFLAT: manufactured by PHASE SHIFT TECHNOLOGY). The surface roughness was measured by the use of an atomic force microscope (AFM) (measurement at 5 $\mu$m square). The flatness was measured by a multifunctional disk interferometer (OPTIFLAT), manufactured by PHASE SHIFT TECHNOLOGY). The end profiles Ski-Jump Roll-Off) of the inner end (ID) and the outer end face (OD) of the substrate were measured by a surface roughness measuring instrument Surftest SV-624 manufactured by Mitsutoyo. The results were as follows:

Ra'=0.052 $\mu$inch (MicroXAM),

Wa=0:815 nm (OPTIFLAT),

Ra=0.772 nm (AFM),

Rmax=6.549 nm AFM),

Rp=2.885 nm,

Flatness=1.051 $\mu$m,

Ski-Jump (ID)=0.006 $\mu$m,

Roll-Off (ID)=−0.029 $\mu$m,

Ski-Jump (OD)=0.082 $\mu$m,

Roll-Off (OD)=0.082 $\mu$m.

(Herein, Ra' (MicroXAM) is an average of 12 points for each of positions 0°, 90°, 180°, and 270° within the principal surface of the substrate at the sides of ID, MD (middle point of the recording/reproducing region), and OD. The same also applies hereinafter.)

In the manner similar to the embodiment 7, each of the opposite surfaces of the glass substrate for a magnetic disk obtained through the abovementioned steps, a NiAl seed layer a CrMo underlayer, a CoCrPtTa magnetic layer, and a carbon hydride protection layer were successively deposited by the use of an in-line sputtering apparatus. Furthermore, a perfluoropolyether lubricant layer was deposited by dipping to obtain a magnetic disk to obtain a magnetic disk.

As a result of a gliding test, no problem were found. However, where the magnetic disk thus obtained was subjected to a touch-down-height (TDH) test, the resultant value was 15 nm and was not excellent.

In addition, the modulation of the magnetic disk was measured. As a result, the long time modulation, the short time modulation, and the total modulation were equal to 2%, 8%, and 10%, respectively.

From the results of the embodiment 1 and the comparative example 1 mentioned above, the surface roughness of the principal surface of the substrate is good in the example 1 as compared with the embodiment 1. However, when the waviness average height Wa exceeds 0.8 nm (OPTIFLAT) and the microwaviness average height Ra' exceeds 0.05 microinch (MicroXAM), the (TDH) (touch-down-height) characteristic is degraded under the influence of the waviness so that the magnetic head can not run at a low flying height. Since the flying stability of the magnetic head is deteriorated due to the waviness of the substrate, the short time modulation caused by the waviness of the substrate is degraded to thereby degrade the total modulation. Therefore, the waviness average height Wa of the substrate is preferably equal to 0.8 nm or less (OPTIFLAT) and the microwaviness average height Ra' is preferably equal to 0.05 microinch or less (MicroXAM).

Presumably, the waviness of the substrate is produced by the elasticity of the polishing pad during the polishing step and deterioration of the accuracy (conformity) of the surface plate (deterioration of flatness) during the first polishing step. In this invention, the polishing step is simplified in mirror finishing is carried out in a single polishing step while a typical polishing step comprises two stages. It is believed that such simplification of the polishing step contributes to reduction in waviness.

By reducing the rotation speed of the surface plate before stop of the polishing during the polishing step, the elasticity of the polishing pad at the stop of polishing is stabilized to reduce the waviness of the substrate.

Embodiments 2–5

Glass substrates for a magnetic disk having different values of the waviness average height Wa and the microwaviness average height Ra' were prepared by controlling the grinding end polishing conditions in the lapping step and the (polishing) step in the embodiment 1 mentioned above.

In the following, the values of the waviness average height Wa and the microwaviness average height Ra' alone are shown. (Other parameters including the surface roughness (Ra, Rmax, Rp), the flatness, Ski-Jump, Roll-Off exhibited excellent values)

Embodiment 2

Wa (OPTIFLAT)=0.398 nm,

Ra' (MicroXAM)=0.020 microinch

Embodiment 3

Wa (OPTIFLAT)=0.421 nm,

Ra' (MicroXAM)=0.024 microinch

Embodiment 4

Wa (OPTIFLAT)=0.823 nm,

Ra' (MicroXAM)=0.044 µinch

Embodiment 5

Wa (OPTIFLAT)=0.613 nm,

Ra' (MicroXAM)=0.032 µinch

The magnetic disks were prepared in the manner similar to the embodiment 1 and subjected to the TDH touch-down-height) test and the evaluation of modulation. As the values of the waviness average height Wa and the microwaviness average height Ra' become smaller, the value of TDH (touch-down-height) becomes smaller and the modulation becomes more excellent.

COMPARATIVE EXAMPLE 2

Next, the lapping step and the polishing step mentioned above were appropriately modified to prepare glass substrates. The surface waviness average height Wa was measured by a tracer-type surface roughness tester (Tencor) for a reference length of 100 µm. As a result, Wa was equal to 0.83 nm. In the manner similar to the embodiment 1, the magnetic disk was prepared and subjected to the (TDH) test and the evaluation of modulation. As a result, measurement could not be made for the entire recording/reproducing region so that the (TDH) was equal to 13 nm and the modulation was equal to 10%.

Embodiment 6

Figure 3:
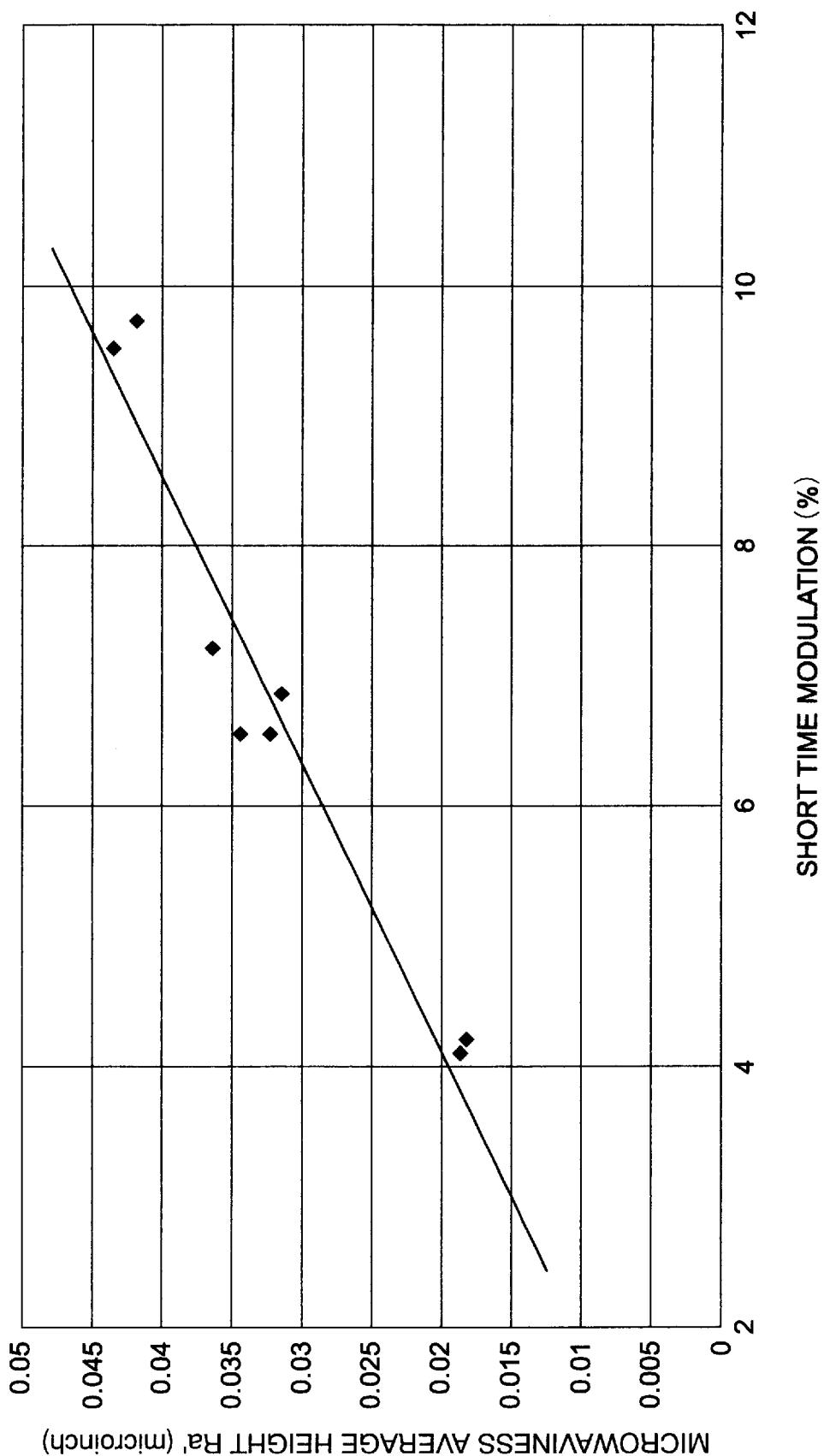
FIG. 3 is a graph showing the relationship between a short time modulation and a microwaviness average height Ra'.
Figure 4:
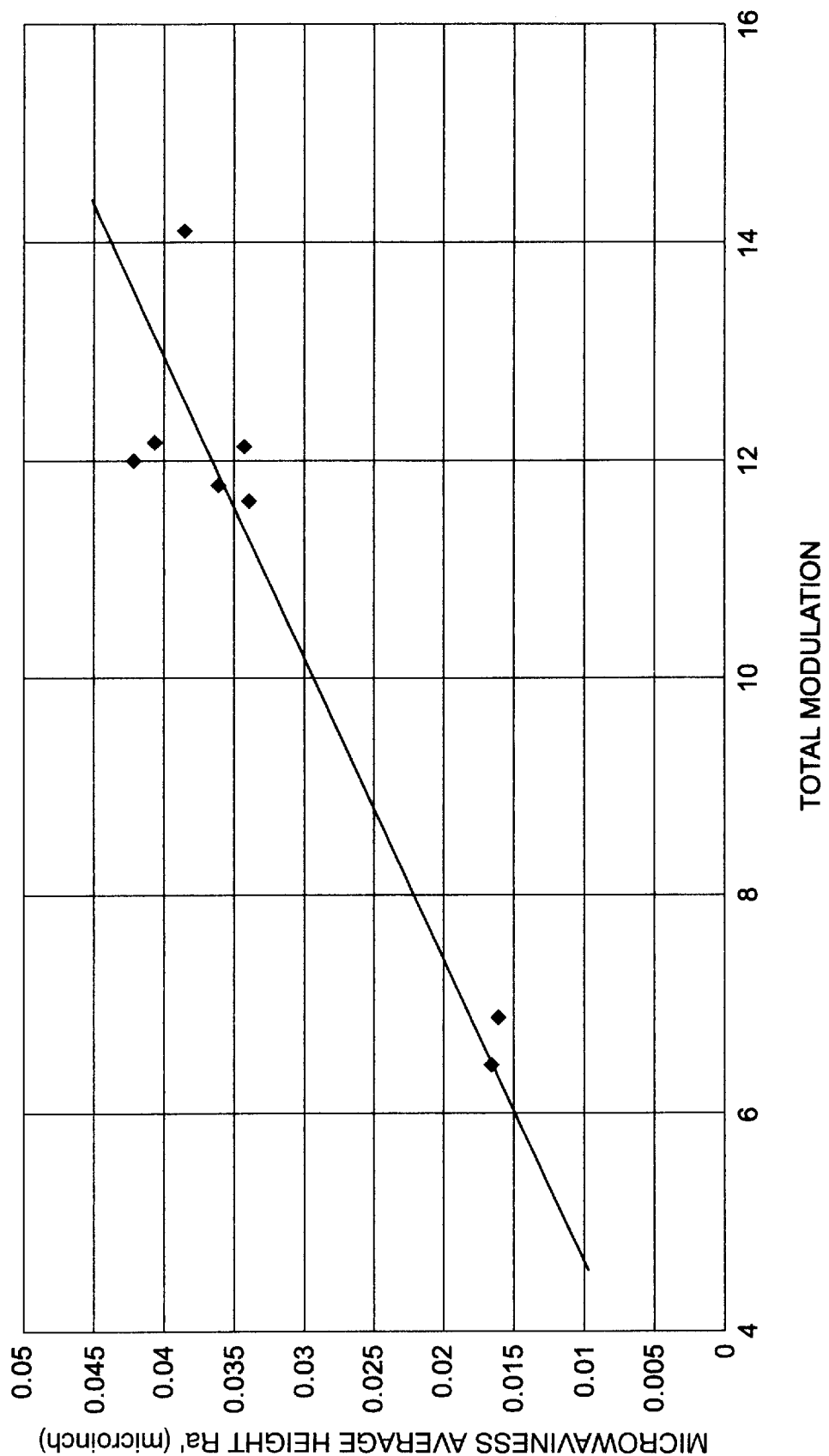
FIG. 4 is a graph showing the relationship between a total modulation and a microwaviness average height Ra'.

Next; four glass substrates for a magnetic disk having different values of the microwaviness average height Ra' were prepared by controlling the grinding and polishing conditions in the lapping step and the polishing step in the embodiment 1 mentioned above and the magnetic disks were prepared the manner similar to that described in conjunction with the embodiment 1. By the modulation measuring method similar to that described above, the opposite surfaces of each magnetic disk were measured. For eight magnetic disks in total, examination was made about the relationship between the microwaviness average height Ra' and the short time modulation (FIG. 3) and the relationship between the microwaviness average height Ra' and the total modulation (FIG. 4). As a result, as illustrated in FIG. 3, the microwaviness average height Ra' of the surface of the substrate and the short time modulation has a correlation. From this, it is understood that, by reducing the microwaviness average height Ra' of the surface of the substrate, the short time modulation caused by the waviness of the substrate can be reduced. Therefore, the total modulation given by a total sum of the long time modulation caused by the sputtering and the short time modulation is also reduced by reducing the microwaviness average height Ra' as illustrated in FIG. 4. Thus, in order to produce a magnetic disk having a total modulation of 6% or less, for example, the microwaviness average height. Ra' of the magnetic disk substrate must be equal to 0.015 microinch or less. In the production method of this invention, the substrate having a small microwaviness average height Ra' is obtained by the use of the substrate having a good flatness before polishing, the abrasive grains having a average grain size in the polishing step, and the soft polisher having a hardness within a range specified in the structure 10. The long time modulation caused by sputtering can be improved by the use of batch (stationary confronting type) sputtering instead of in-line sputtering.

Embodiment 7

Figure 5:
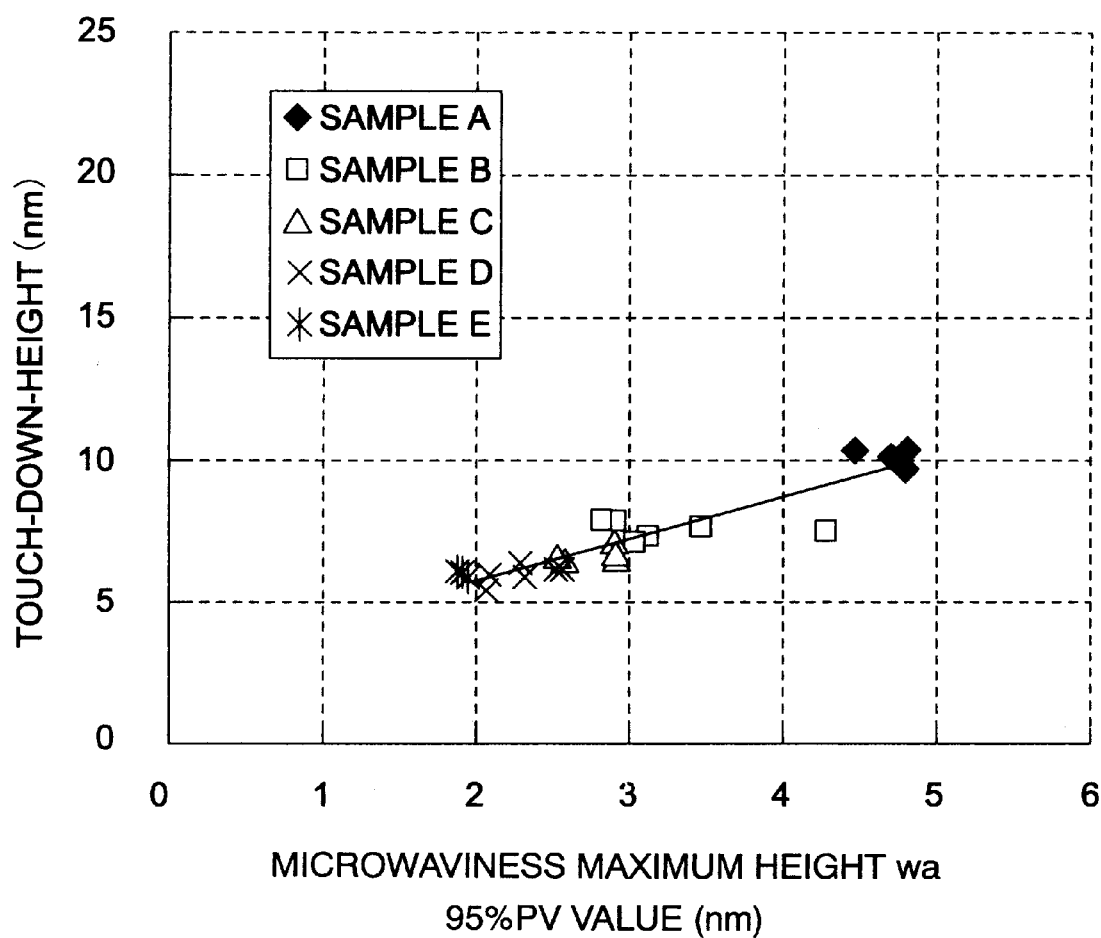
FIG. 5 is a graph showing the relationship between a touch-down-height and a microwaviness maximum height wa (95% PV value)
Figure 6:
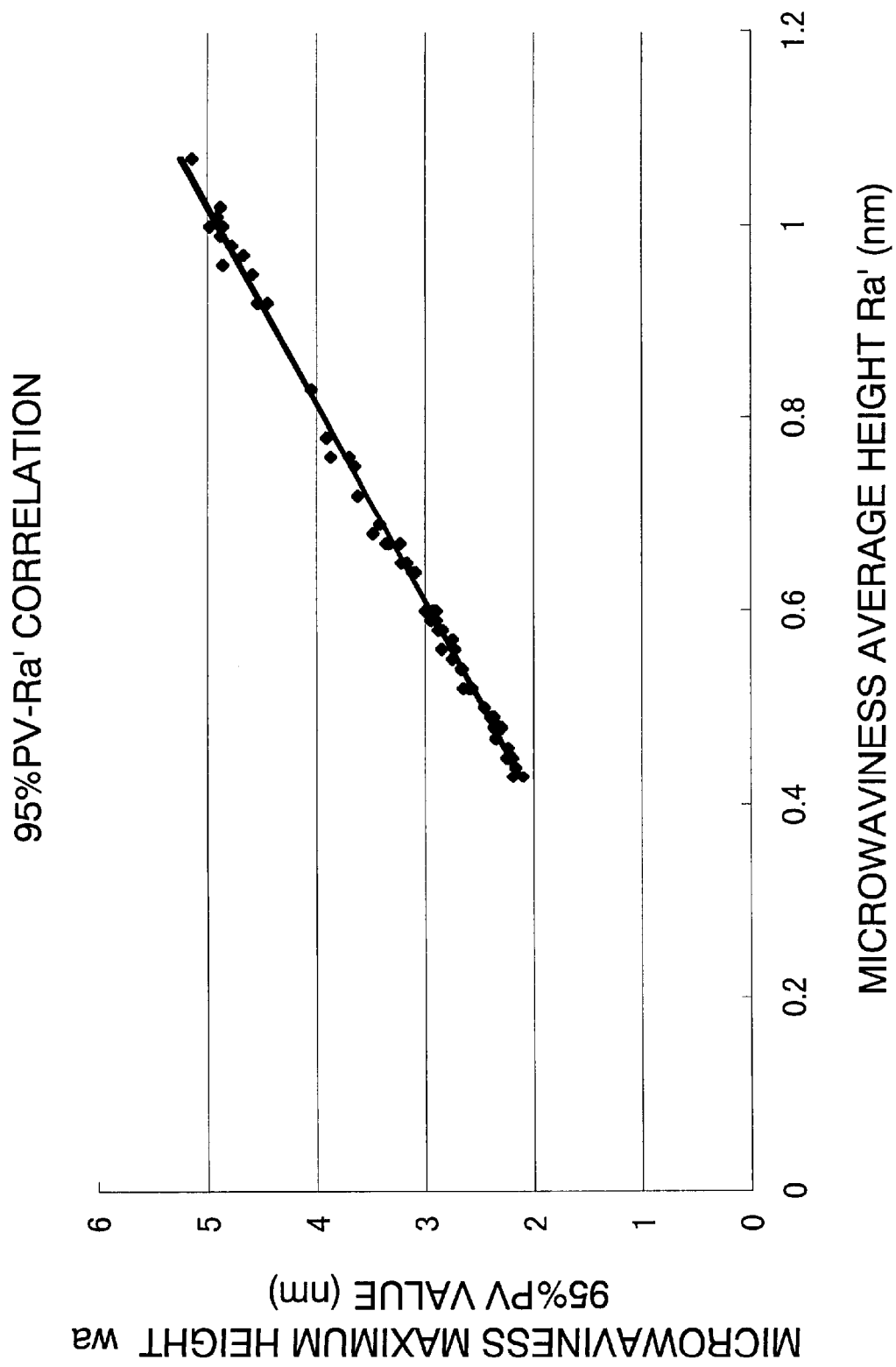
FIG. 6 is a graph showing the relationship between a microwaviness maximum height wa (95% PV value) and a microwaviness average height Ra'.

Next, 25 glass substrates (5 types) for a magnetic disk having different values of the microwaviness maximum height wa were prepared by controlling the grinding and polishing conditions in the lapping step and the polishing step in the embodiment 1 mentioned above and the magnetic disks were prepared in the manner similar to that described in conjunction with the embodiment 1. The relationship between the microwaviness maximum height wa and the touch-down-height is illustrated in FIG. 5. The microwaviness maximum height wa plotted on the abscissa is a value (95% PV value) obtained by preparing a histogram of measurement point values xl' at all of the measurement points and extracting the measurement paint values falling within a deviation of 95% in a distribution of all measurement point values in the histogram. From the above-mentioned result, it is understood that the touch-down-height can be reduced by reducing the microwaviness maximum height wa of the surface of the substrate. For example, in order to produce the magnetic disk having the touch-down-height of 9 nm or less, the microwaviness maximum height wa of the substrate is equal to about 4.3 nm or less. The substrate having a small microwaviness maximum height wa is obtained by the use of the substrate having a good flatness before polishing, the abrasive grains having a small average grain size in the polishing step, and the acid, polisher having a hardness within a range specified in the structure 10. Herein, in order to obtain the touch-down-height of 9 nm or less, the value of Rp must be equal to 9 nm or less as the condition of the surface roughness. With respect to the substrates extracted from the substrates according to the above-mentioned embodiments and the following embodiments, a relationship between the microwaviness average height Ra' and the 95% PV value (the microwaviness maximum height wa) was observed. As a result, a correlation between the microwaviness average height Ra' and the 95% PV value (the microwaviness maximum height waviness was found which are shown in FIG. 8. When he substrate has the correlation between the microwaviness average height Ra' and the 95% PV value (the microwaviness maximum height wa), it is possible in design the touch-down-height and control the surface of the substrate by the microwaviness average height Ra'.

Embodiments 8 through 10

Glass substrates for a magnetic disk and magnetic disks were prepared in the manner similar to the embodiment 1 except that the soft polisher (pad) had a hardness of 63 (Embodiment 8), 68 (Embodiment 9), and 87 (Embodiment 10). As a result, the microwaviness (95% PV value) was equal to 4.69 nm (Embodiment 8), 3.36 nm (Embodiment 9), and 3.33 nm (Embodiment 10). Therefore, it has been confirmed that the microwaviness is adjusted by adjusting the hardness of the soft polisher (pad). In addition, the touch-down-height measured for each of the embodiment 9 and the embodiment 14 was equal to 7.5 nm. Thus, it has been confirmed that the correlation between the microwaviness maximum height wa (95% PV value) in the embodiment 7 and the touch-down-height is well established.

In the above-mentioned embodiments use is made of the substrates having the correlation between the microwaviness average height Ra' and the 95% PV value (the microwaviness maximum height wa). However, use may be made of substrates which do not have the correlation between the microwaviness average height Ra' and the 95% PV value (the microwaviness maximum height wa).

As described above, according to this invention, the surface waviness of the surface of the substrate is measured at measurement points in a surface region by the use of a contactless laser interference technique. Therefore, the surface can be selected to an appropriate range as the substrate for an information recording medium and the information recording medium adapted to recording and reproducing with a high density. Since the surface waviness of the substrate is not greater than a predetermined value, the modulation is excellent and the touch-down-height is reduced. Therefore, it is possible to obtain the information recording medium for which the recording and the reproducing operations can be carried out with a high density.

By the polishing method of this invention, it is possible to control the surface waviness measured as mentioned above to a predetermined range.

By the method of controlling the surface of the substrate for a magnetic recording medium, it is possible to produce the magnetic recording medium having a desired modulation characteristic and a desired touch-down-height. Thus, high recording density is achieved.

What is claimed is:

1. A substrate for an information recording medium, wherein said substrate is made of a glass, said substrate having a microwaviness average height Ra' not greater than 0.05 microinch as measured for measurement points within a measurement region of 50 $\mu$m×50 $\mu$m to 4 mm×4 mm on a surface of said substrate, said microwaviness average height Ra' being given by:

$$Ra' = \frac{1}{n}\sum_{i=1}^{n}|xi - \bar{x}|,$$

where xi represents a measurement point value of each measurement point, $\bar{x}$ representing an average value of the measurement point values, n representing the number of said measurement points.

2. A substrate for an information recording medium, wherein said substrate is made of a glass, said substrate having a microwaviness period between 2 $\mu$m and 4 mm and a microwaviness average height Ra' not greater than 0.05 microinch as measured for measurement points in a measurement region on a surface of said substrate, said microwaviness average height Ra' being given by:

$$Ra' = \frac{1}{n}\sum_{i=1}^{n}|xi - \bar{x}|,$$

where xi represents a measurement point value of each measurement point, $\bar{x}$ representing an average value of the measurement point values, n representing the number of said measurement points.

3. A substrate for an information recording medium, wherein said substrate is made of a glass, said substrate having a disk shape, said substrate having a waviness period in a range between 300 $\mu$m and 5 mm and a waviness average height Wa of 1.0 nm or less as measured for measurement points in a measurement region surrounded by two concentric circles which is spaced from a center of a surface of said substrate by a predetermined distance, said waviness average height Wa being given by:

$$Wa = \frac{1}{N}\sum_{i=1}^{N}|Xi - \bar{X}|$$

where Xi represents a measurement point value of each measurement point, $\bar{X}$ representing an average value of the measurement point values, n representing the number of said measurement points.

4. A substrate for an information recording medium as claimed in any one of claims 1, 2 or 3, wherein said substrate is a substrate for a magnetic recording medium.

5. An information recording medium comprising a substrate claimed in claim 4 and at least a recording layer formed on said substrate.

6. An information recording medium comprising a substrate claimed in any one of claims 1, 2 or 3 and at least a recording layer formed on said substrate.

7. An information recording medium as claimed in 6, wherein said recording layer is a magnetic layer.

* * * * *

UNITED STATES PATENT AND TRADEMARK OFFICE
CERTIFICATE OF CORRECTION

PATENT NO. : 6,537,648 B1
DATED : March 25, 2003
INVENTOR(S) : Kouji Takahashi et al.

It is certified that error appears in the above-identified patent and that said Letters Patent is hereby corrected as shown below:

<u>Column 16,</u>
Line 42, delete "Ra'=0.028 µ inch (MicroXAM)" insert -- Ra'=0.026 µ inch (MicroXAM) --.
Line 47, delete "Flatness=0.0885µm" insert -- Flatness=0.983 µ m --.

Signed and Sealed this

Twenty-fifth Day of October, 2005

JON W. DUDAS
*Director of the United States Patent and Trademark Office*